Nov. 24, 1931.     C. C. FARMER     1,832,861
FLUID PRESSURE BRAKE
Filed Nov. 21, 1930
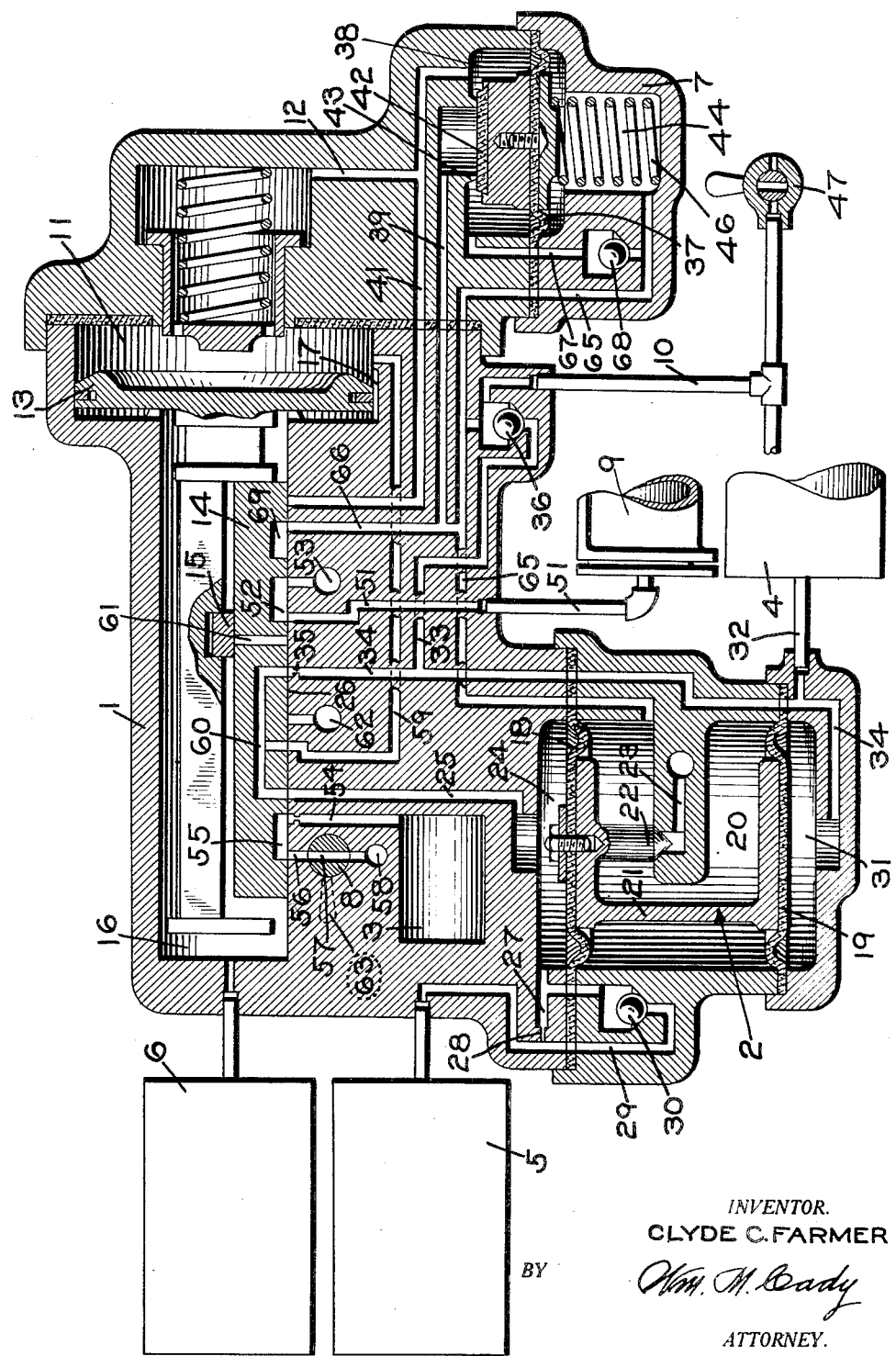
INVENTOR.
CLYDE C. FARMER
BY *Wm. M. Cady*
ATTORNEY.

Patented Nov. 24, 1931

1,832,861

UNITED STATES PATENT OFFICE

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

FLUID PRESSURE BRAKE

Application filed November 21, 1930. Serial No. 497,218.

This invention relates to fluid pressure brake equipment for railway rolling stock and more particularly to such equipment for use on a caboose or other rear unit or units of a train.

With the increase in train lengths, the difficulty of applying the brakes without causing excessive shocks, due to the running in of the slack between the cars before the brakes are applied on the rear cars of the train, is correspondingly increased.

In actual service, with each car and the caboose of a long train equipped with the usual type of fluid pressure brake apparatus, difficulty is encountered in causing all brakes on the train to promptly apply because of the slow rate of brake pipe reduction. This slow rate of brake pipe reduction is due to the great length of the brake pipe, to the auxiliary reservoirs of the brake equipment discharging fluid into the brake pipe through the feed grooves around the triple valve pistons, and due to the fact that the increased amount of fluid under pressure in the brake pipe must be discharged through the brake valve device, so that excessive heavy reductions in brake pipe pressure must be made to insure the application of all brakes. Consequently, shocks are produced, not only because of the slow serial application of the brakes, but also because the brakes apply non-uniformly in degree of brake force.

A further difficulty is encountered in that, if an angle cock in the train should be inadvertently or maliciously closed, an application of the brakes back of the closed cock could not be effected since, the average brake pipe leakage to be expected on a train is at such a slow rate that fluid under pressure from the auxiliary reservoirs flows through the feed grooves around the triple valve pistons of the equipments back of the closed angle cock without a sufficient pressure differential being created on each piston to cause it to be operated to brake applying position.

The principal object of my invention is to provide a fluid pressure brake apparatus for use on the rear end of a train which will obviate the above mentioned difficulties in controlling the fluid pressure brakes on a train.

A specific object of my invention is to provide the caboose or other rear unit of a train with a fluid pressure brake apparatus which is operative to effect a predetermined reduction in brake pipe pressure at the rear of the train in the event of the pressure being reduced at a rate slower than a service rate such as a reduction effected by leakage of fluid from the brake pipe back of a closed angle cock.

A further specific object of my invention is to provide fluid pressure brake apparatus operative to effect a predetermined reduction in brake pipe pressure at a service rate at the rear end of a train in the event of brake pipe pressure at the rear end being reduced at a rate slower than a service rate in initiating an application of the brakes from the head end of the train.

A further object of my invention is to provide means operative to render ineffective the means for effecting a brake pipe reduction at the rear end of a train.

Other objects and advantages will appear in the following more detailed description of the invention.

In the accompanying drawing, the single figure is a diagrammatic view, mainly in section, of a fluid pressure brake apparatus embodying my invention.

As shown in the drawing, the fluid pressure brake apparatus for a caboose may comprise a triple valve device 1, a discharge valve device 2, an expansion chamber or reservoir 3, a stabilizing reservoir 4, an equalizing reservoir 5, an auxiliary reservoir 6, a valve device 7, a cut-out cock 8, a brake cylinder 9, and a brake pipe 10.

The triple valve device 1, as shown in the drawing, may be of the type in which the piston makes full traverse in effecting a service application of the brakes and comprises a casing having a piston chamber 11 connected to the brake pipe 10 through a passage 12 and containing a piston 13 adapted to control the operation of main slide valve 14 and an auxiliary slide valve 15 contained in a valve chamber 16 connected when the piston 13 is in release position to the piston chamber 11 through a feed groove 17 extending around the piston from one side thereof to the other.

The discharge valve device 2 is for the purpose of venting fluid under pressure from the brake pipe 10 and may comprise a casing in which there is mounted, in spaced relation to each other, flexible diaphragms 18 and 19 of equal area. Contained in a chamber 20 between the diaphragms 18 and 19 and interposed between and secured to both diaphragms is a discharge valve member 21 having a discharge valve 22 adapted to cooperate with a valve seat formed on the casing for controlling communication from the chamber 20 to the atmosphere through a passage 23. The valve chamber 20 is constantly connected to the brake pipe 10 and piston chamber 11 in the triple valve device through passage 65.

At the upper side of the flexible diaphragm 18 of the discharge valve device is a chamber 24 which leads through a passage 25 to the seat 26 of the main slide valve of the triple valve device and which is constantly connected to the equalizing reservoir 5 through a passage 27 which contains a restriction 28 for restricting the flow of fluid from the chamber 24 to the reservoir 5. Connected to the passage 27 at each side of the restriction 28 is a passage 29 containing a ball check valve 30 which is adapted to prevent the flow of fluid under pressure through the passage 29 from the passage 27 at one side of the restriction 28 to the passage 27 at the other side of the restriction. The passage 29 and ball check valve 30 constitute a by-pass about the restriction 28 for the flow of fluid under pressure at an unrestricted rate from the reservoir to the chamber 24.

At the under side of the flexible diaphragm 19 of the discharge valve device is a chamber 31 to which the stabilizing reservoir 4 is constantly connected through a pipe and passage 32 and passage 34. The passage 34 leads to the seat 26 of the main slide valve of the triple valve device and at a point beyond the juncture of the passages 33 and 34 is provided with a restriction 35. One end of the passage 33, as just described, connects with the passage 34 and the other end connects with the passage 65; there being a ball check valve 36 interposed in the passage 33, which prevents fluid under pressure from the brake pipe from flowing through the passage 33 to the passages 32 and 34. The purpose of the stabilizing reservoir 4 is to add volume to the chamber 31 to render the discharge valve device 2 less sensitive to fluctuations in the pressure of fluid supplied from the brake pipe.

The valve device 7 is for the purpose of controlling the flow of fluid under pressure from the piston chamber 11 to the brake pipe 10 when the brake pipe pressure is reduced to effect an application of the brakes, and may comprise a flexible diaphragm 37 having a chamber 38 at one side connected to a passage 41 leading to the seat of slide valve 14, the passage 12 opening into passage 41, so that piston chamber 11 is connected at all times to the chamber 38.

The diaphragm 37 carries a valve 42 adapted to seat on an annular seat rib 43 and said valve controls communication from chamber 38 to a passage 39, which communicates with a passage 66 leading to the seat of slide valve 14 and also communicating with passage 65, which leads to chamber 44. A light coil spring 46 in chamber 44 acts on diaphragm 37 and opposes movement of diaphragm 37 to unseat the valve 42.

A by-pass passage 67 leads from passage 65 to chamber 38 and a check valve 68 in said passage prevents back flow from chamber 38 to passage 65.

In operation, when the rear angle cock 47 on the caboose is closed, fluid under pressure is supplied from the brake pipe 10 to passage 65 and flows past check valve 68, through passage 67 to chamber 38 and thence through passages 41 and 12 to piston chamber 11 and the triple valve piston 13 is shifted to its release position, carrying with it the auxiliary and main slide valves 15 and 14 respectively to their release positions. With the piston 13 in release position, fluid under pressure in the chamber 11, as supplied from the brake pipe 10 through passage 12, flows through the feed groove 17 around the piston to valve chamber 16 and from thence to the auxliary reservoir 6. Fluid under pressure from the passage 65 flows through a passage 39 to the inner seated area of the valve 42 of the valve device 7 and fluid under pressure from the passage 41 flows to the chamber 38 in this valve device. Fluid under pressure supplied to the passage 65 also flows therethrough to the chamber 20 of the discharge valve device 2.

With the main slide valve 14 of the triple valve device in its release position, the brake cylinder 9 is connected to the atmosphere through a pipe and passage 51, a cavity 52 in the slide valve 14 and a passage 53, and the expansion chamber 3 is connected to the atmosphere through a restricted passage 54, a cavity 55 in the slide valve, a passage 56, a passage 57 in the plug valve of the cut-out cock 8, and a passage 58.

Further, with the main slide valve 14 in its release position, fluid under pressure supplied to the piston chamber 11 in the triple valve device, flows at an unrestricted rate to the diaphragm chamber 24 in the discharge valve device 2 through a passage 59, a port 60 in the slide valve 14 and passage 25. From the port 60 fluid under pressure also flows to the diaphragm chamber 31 in the discharge valve device through the restriction 35 and passage 34. Fluid under pressure supplied to the passage 34 flows to the stabilizing reservoir 4 through passage and pipe 32. It will here be noted that the ball check valve 36 prevents the flow of fluid under pressure from the passage 65 to the passage 33 so that the rate at which the chamber 31 and reservoir 4 are charged is governed entirely by the flow of fluid through the restriction 35.

Fluid under pressure supplied to the diaphragm chamber 24 in the discharge valve device flows to the equalizing reservoir 5 through passage 27 at a rate governed by the restriction 28, the ball check valve 30 preventing the flow of fluid around the restriction by way of passage 29.

During the charging period, the restriction 28 so governs the rate of flow of fluid under pressure from the diaphragm chamber 24 in the discharge valve device 2 and the restriction 35 so governs the rate of flow of fluid under pressure to the diaphragm chamber 31, that fluid is maintained at a higher pressure in chamber 24 than is obtained in the chamber 31, so that the valve 22 is maintained seated, thus preventing the flow of fluid under pressure from the brake pipe to the atmosphere. However, when the equipment is fully charged, the pressures on both sides of both diaphragms are equal and the valve 22 is maintained seated by the force of gravity.

When the apparatus is fully charged, the pressures of fluid on both sides of the flexible diaphragm 37 of the supply valve device 7 are substantially equal and due to this, the pressure of the spring 46 maintains the valve 42 seated on the seat rib 43.

In effecting a service application of the brakes on a train, the engineer's brake valve device is manipulated to service position in which a reduction in brake pipe pressure is effected in the usual manner. At the front end of the train this reduction will be at a service rate and at the rear end of the train may be such that the triple valve device will not be caused to operate to effect an application of the brakes. When a caboose, equipped with my present apparatus, constitutes the rear unit of a train, and when the brake pipe pressure is reducing at a rate slower than a service rate, the check valve 68 prevents the pressure in chamber 38 and consequently in triple valve piston chamber 11 from being reduced with the brake pipe, so that the brake pipe pressure continues to fall until the pressure in chamber 44 is reduced sufficiently to permit the bottled up pressure in chamber 38 and the brake pipe pressure, supplied through passage 39 to the seated area of the valve 42, to overcome the pressure of spring 46, acting on diaphragm 37. The diaphragm 37 will then be flexed so as to unseat the valve 42. Fluid under pressure is then vented from chamber 38 and piston chamber 11 past the unseated valve 42 to passage 39 and thence to the brake pipe 10 at such a rate as to ensure the positive movement of the triple valve piston 13 to service application position. In this position, service port 61 registers with passage 51, so that fluid under pressure is supplied from the auxiliary reservoir 6 to the brake cylinder 9 in the usual manner.

With the main slide valve 14 in service position, a cavity 69 connects passage 41 with passage 66, so that any further reduction in brake pipe pressure is effective in piston chamber 11, regardless of the position of the valve 42.

Further, with the main slide valve 14 in service position, fluid under pressure from the diaphragm chamber 24 in the discharge valve device as supplied from the equalizing reservoir 5 by way of passages 27 and 29 and past the ball check valve 30, flows to the expansion chamber 3 through passage 25, cavity 55 in the main slide valve 14 and restricted passage 54, thus reducing the pressure of fluid in chamber 24 and the equalizing reservoir. Upon thus effecting the reduction in the pressure of fluid in the chamber 24, fluid under pressure in the chamber 31 and stabilizing reservoir causes the diaphragm 19 to be flexed upwardly, lifting the valve member sufficiently to unseat the discharge valve 22. With the valve 22 thus unseated, fluid under pressure from the brake pipe is discharged to the atmosphere through passage 65, chamber 20 in the discharge valve device and passage 23.

As the pressure of fluid in the brake pipe reduces, the pressure of fluid in the diaphragm chamber 31 reduces with it since fluid under pressure from this chamber flows to the brake pipe through passages 34 and 33, past the ball check valve 36 and passage 65. Now when the pressure of fluid in the chamber 31, which pressure corresponds to brake pipe pressure, is reduced slightly below the equalized pressure of the equalizing reservoir 5 and expansion chamber 3, present in chamber 24, the pressure of fluid in this diaphragm chamber causes the diaphragm 18 to flex downwardly, seating the valve 22 and thus closing off the further flow of fluid under pressure from the brake pipe to the atmosphere.

When the valve device 2 operates in the manner just described, the rate of brake pipe reduction resulting therefrom at the rear of the train preferably corresponds with the rate of brake pipe reduction at the head end of the train, thus insuring the desired even braking action throughout the length of the train.

With the main slide valve 14 in service position, the port 60 registers with a passage 62 leading to the atmosphere, thus venting fluid under pressure from port 60 at the under side of the valve, so that fluid under pressure in the valve chamber 16 will cause the valve to frictionally engage the valve seat more firmly. This is done for the purpose of preventing accidental movement of the piston toward release position due to surges in brake pipe pressure.

To release the brakes, the brake pipe pressure is increased in the usual manner, causing the apparatus to be recharged with fluid under pressure and to operate to connect the brake cylinder and the expansion reservoir to the atmosphere in the same manner as described in connection with the initial charging of the apparatus.

Since this apparatus is sensitive to a slight reduction in brake pipe pressure, the average leakage from the brake pipe back of an angle cock which has been inadvertently or maliciously closed, will cause an application of the brakes to be effected on the cars back of the closed angle cock.

In descending a grade, where it is desired to cycle the brakes on the train, the discharge valve device 2 on the caboose should be rendered ineffective to release fluid under pressure from the brake pipe after each application of the brakes, and it is for this purpose the cut-out cock 8 is provided. To do this, a trainman rotates the plug valve of the cut-out cock 8, through the medium of a handle 63, to a position in which communication from the passage 56 to the passage 57 leading to the atmosphere is closed off. Now when the first application of the brakes is effected, the discharge valve device will be caused to operate to vent fluid under pressure from the brake pipe in the same manner as before described in connection with the effecting of a service application. However, when the main slide valve 14 is returned to release position in which, the cavity 55 connects the passages 54 and 56, the cut-out cock being closed prevents the flow of fluid under pressure from the expansion reservoir to the atmosphere. Since the fluid under pressure is thus bottled up in the chamber 3, the reductions in the pressure of fluid in the chamber 34 in subsequent brake applications will be insufficient to permit the operation of the device to vent fluid under pressure from the brake pipe.

If the brake pipe pressure on a vehicle equipped with my proposed equipment should be reduced at substantially a service rate or faster, the discharge valve device 2 will not operate to further reduce brake pipe pressure, thus preventing the brake pipe pressure from being reduced at an undesired rate such as an emergency rate when only a service rate of reduction is intended. In this connection it will be noted that when the brake pipe reduction is at a service rate, the pressure of fluid in the diaphragm chamber 24, which reduces through the restricted passage 54 at substantially a service rate, and the pressure of fluid in chambers 20 and 31 which reduce with the brake pipe pressure, will all be substantially equal so that the valve 22 will be maintained seated by the force of gravity. If the reduction in brake pipe pressure should be at a faster rate, the pressure of fluid in the chamber 24 acts upon the diaphragm 18 to maintain the valve 22 seated. If an over reduction in brake pipe pressure should be effected, the pressure of fluid in the chamber 24 acting on the diaphragm 18 will maintain the valve 22 seated, thus preventing the unnecessary loss of fluid under pressure from the brake pipe.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake pipe and a triple valve device operated upon a reduction in brake pipe pressure for effecting an application of the brakes, of a valve device for controlling communication through which brake pipe pressure on said triple valve device is reduced and operated only upon a predetermined reduction in brake pipe pressure for opening said communication.

2. In a fluid pressure brake, the combination with a brake pipe and a triple valve device operated upon a reduction in brake pipe pressure for effecting an application of the brakes, of a valve device normally closing communication through which fluid under pressure is vented from said triple valve device and operated only upon a predetermined reduction in brake pipe pressure for opening said communication.

3. In a fluid pressure brake, the combination with a brake pipe and a triple valve device including a piston contained in a chamber normally charged with fluid at brake pipe pressure, of a valve device for controlling flow of fluid from said chamber to the brake pipe and operated only upon a predetermined reduction in brake pipe pressure for opening communication to permit flow of fluid from said chamber to the brake pipe.

4. In a fluid pressure brake, the combination with a brake pipe and a triple valve device including a piston contained in a chamber normally charged with fluid at brake pipe pressure, of a valve device for controlling communication through which fluid is vented from said chamber to the brake pipe and operated only upon a predetermined reduction in brake pipe pressure for opening said communication.

5. In a fluid pressure brake, the combination with a brake pipe and a triple valve device including a piston contained in a chamber normally charged with fluid at brake pipe pressure, of a valve device comprising a valve for controlling communication from said chamber to the brake pipe, a spring, and a movable abutment subject on one side to the pressure in said chamber and on the opposite side to brake pipe pressure and the pressure of said spring for operating said valve.

6. In a fluid pressure brake, the combination with a brake pipe and a triple valve device including a piston contained in a chamber normally charged with fluid at brake pipe pressure, of a passageway through which fluid under pressure is supplied from the brake pipe to said triple valve piston chamber, a check valve for preventing back flow through said passageway from said chamber to the brake pipe, and a valve device for controlling communication through which fluid under pressure is vented from said chamber to the brake pipe, and operated only upon a predetermined reduction in brake pipe pressure for opening said communication.

In testimony whereof I have hereunto set my hand, this 19th day of November, 1930.

CLYDE C. FARMER.